US008359864B2

(12) United States Patent
Cong

(10) Patent No.: US 8,359,864 B2
(45) Date of Patent: Jan. 29, 2013

(54) WIND-GAS ENGINE ASSEMBLY AND MOTOR VEHICLE WITH THE SAME

(76) Inventor: Yang Cong, Guangdong (CN)

( * ) Notice: Subject to any disclaimer, the term of this patent is extended or adjusted under 35 U.S.C. 154(b) by 995 days.

(21) Appl. No.: 12/377,513

(22) PCT Filed: Aug. 16, 2007

(86) PCT No.: PCT/CN2007/002468
§ 371 (c)(1),
(2), (4) Date: Mar. 10, 2009

(87) PCT Pub. No.: WO2008/022556
PCT Pub. Date: Feb. 28, 2008

(65) Prior Publication Data
US 2011/0280709 A1  Nov. 17, 2011

(30) Foreign Application Priority Data
Aug. 16, 2006  (CN) .......................... 2006 1 0062135

(51) Int. Cl.
*F01B 21/04* (2006.01)
*B60K 16/00* (2006.01)
(52) U.S. Cl. ............. 60/716; 60/718; 180/2.2; 180/69.6
(58) Field of Classification Search .................... 60/716, 60/718, 721; 180/2.1, 2.2, 302, 69.6
See application file for complete search history.

(56) References Cited

U.S. PATENT DOCUMENTS

| 3,876,925 | A  | * | 4/1975 | Stoeckert | 322/1 |
| 4,282,944 | A  | * | 8/1981 | Trumpy | 180/2.2 |
| 7,398,841 | B2 | * | 7/2008 | Kaufman | 180/2.2 |
| 7,641,005 | B2 | * | 1/2010 | Cong | 180/2.2 |
| 8,177,002 | B2 | * | 5/2012 | Cong | 180/2.2 |
| 8,181,724 | B2 | * | 5/2012 | Cong | 180/2.2 |
| 8,240,416 | B2 | * | 8/2012 | Cong | 180/165 |

FOREIGN PATENT DOCUMENTS

| CN | 2073484 U | 3/1991 |
| CN | 2242352 Y | 12/1996 |
| CN | 1295943 A | 5/2001 |
| CN | 2703139 Y | 6/2005 |
| CN | 1766310 A | 5/2006 |
| CN | 2792848 Y | 7/2006 |
| CN | 2802090 Y | 8/2006 |
| CN | 1828046 A | 9/2006 |

OTHER PUBLICATIONS

International Search Report; (International Patent Application No. PCT/CN2007/002468 filed Aug. 16, 2007).

* cited by examiner

*Primary Examiner* — Hoang Nguyen
(74) *Attorney, Agent, or Firm* — Ping Wang; Andrews Kurth, LLP

(57) ABSTRACT

A wind-gas engine assembly and a motor vehicle with the same are provided. The wind-gas engine assembly comprises a high pressure gas engine (20) and a wind resistance engine (22) independent of each other. The high pressure gas engine generates primary power through injection of the high pressure gas. The wind resistance engine comprises an impeller chamber (221) and an impeller (222). The impeller chamber is provided with an air inlet (51) for receiving external wind resistance airflow, by which the impeller is driven to rotate to generate auxiliary power. The present invention not only utilizes wind resistance, but also saves energy and protects the environment.

27 Claims, 9 Drawing Sheets

A-A

WIND-GAS ENGINE ASSEMBLY AND MOTOR VEHICLE WITH THE SAME

FIELD

The present invention belongs to the mechanical field, and relates to an engine, which may be installed in various power machines that travel at a certain speed, such as large, medium or small sized cargo/passenger vehicles having steering wheels, railway trains, subway trains, marine vehicles and air crafts.

BACKGROUND

An engine using fuel as an energy source will consume a large amount of fuel, and discharge a large amount of waste gas and hot gas, which will pollute the environment. In order to save the fuel energy source and protect the global environment, there is a need for an engine that does not consume fuel, discharge waste gas or hot gas, or cause pollution.

Chinese patent CN2242352Y discloses a wind power electric generator for automobile, which comprises a windmill, a driving mechanism connected to the windmill, an electric generator connected to the driving mechanism, and a storage battery circuit connected to the output of the electric generator. The wind power electric generator for automobile is installed in the front of an automobile. The windmill rotates when the automobile travels, making the generator generate electricity, which is stored in the storage battery to operate the engine.

Chinese patent CN2073484U discloses a transport vehicle driven by electricity generated from wind power, which comprises a body and a wind power electricity generator, wherein the body comprises wheels, a chassis, a carriage and a storage battery and the wind power electric generator comprises an impeller, a shaft and an electric generator. The electric generator is fixed to the carriage and the impeller is fixed to the shaft. The impeller drives the generator through the shaft and the output of the electric generator is connected to the storage battery. During operation, wind energy is converted through the impeller into mechanical kinetic energy, which drives the electric generator via the shaft to generate electricity, and electrical energy generated by the electric generator is stored in the storage battery.

A common advantage of both CN2242352Y and CN2073484U is that wind energy can be converted into electrical energy, which is stored in the storage battery for use. However, they also have the following common shortcomings: 1. Energy conversion has to be performed, i.e. wind energy has to be converted into electrical energy. 2. They are only applicable to a transport vehicle driven by electric power; however, in order to convert electrical energy in turn into mechanical energy, a complicated electromechanical energy conversion system and a circuit control system are necessary for a transport vehicle driven by electric power. 3. The energy conversion efficiency is low. When storing the energy, wind energy needs to be converted into electrical energy; when using the energy, the stored electrical energy needs to be converted in turn into mechanical energy. Two energy conversions in the whole process result in a low energy conversion efficiency. 4. The storage battery is limited in capacity and is bulky, which greatly limits the application field of the transport vehicle using the storage battery as the primary power.

In view of the above, the traditional thinking always followed by person skilled in the art when utilizing wind energy is to convert wind energy into electrical energy, store the generated electrical energy, and utilize the stored electrical energy as needed with the electromechanical energy conversion and control technology in the prior art.

In order to utilize wind energy more directly, especially to directly utilize a wind resistance airflow generated in the running of a power machine, the applicant of the present invention filed a Chinese patent application titled with "A Wind-Air Engine-An Engine Employing Wind Power Pressure for Replacing Fuel Energy Source" with the publication number CN1828046, which discloses a wind-air engine and a motor vehicle equipped with the same, which comprise at least one impeller chamber, an impeller installed in the impeller chamber, and an air-jet system for jetting high pressure gas into the impeller chamber. The invention is characterized mainly in that the impeller chamber is provided with an air inlet for receiving external wind resistance airflow and with the air-jet system. During operation, the wind-air engine of the invention, which is installed in a power machine that can travel (especially a motor vehicle), can directly utilize the wind resistance airflow the power machine encounters through the air inlet provided for receiving the external wind resistance airflow, thereby transforming the resistance into a power. With the air-jet system and employing high pressure gas as the primary power, there is no fuel consumption, no waste gas or hot gas discharge, and no pollution.

The above-mentioned invention initiatively proposed a wind-air engine that directly utilizes the wind resistance airflow as auxiliary power and employs the high pressure gas as the primary power, as well as a motor vehicle equipped with the wind-air engine. The invention does not need to convert the wind resistance airflow into electrical energy. Therefore, no complicated electromechanical energy conversion system or circuit control system is needed, which greatly simplifies the structure of the power machine, especially of the motor vehicle. Besides, the invention provided a new approach to energy saving and an environmental protective substitute for fuel. However, in order to better utilize the wind resistance airflow and high pressure gas, to produce optimal cooperation between the primary power and the auxiliary power, and to increase usage efficiency of the primary power, it is still necessary to further improve the structure of the wind-air engine of the invention and the motor vehicle equipped with the wind-air engine.

SUMMARY

An object of the present invention is to provide a wind-gas engine assembly and a motor vehicle equipped with the same, wherein the wind-gas engine assembly employs high pressure gas as primary power and directly utilizes the wind resistance airflow that a power machine encounters during travel as auxiliary power, and can better utilize the high pressure gas and the wind resistance airflow cooperatively.

Another object of the present invention is to provide a wind-gas engine assembly and a motor vehicle equipped with the same, wherein the wind-gas engine assembly can not only directly employ the wind resistance airflow as a power, but also transform this power into regenerated high pressure gas to be stored for future use.

A further object of the present invention is to provide a wind-gas engine assembly and a motor vehicle equipped with the same, wherein the wind-gas engine assembly is capable of recycling in time an inertia braking force produced when the motor vehicle is braked to decelerate, by transforming the inertia braking force into regenerated high pressure gas to be stored for future use.

The technical solution for achieving the above objects is described as below.

A wind-gas engine assembly is provided, which comprises at least one first high pressure gas engine and at least one wind resistance engine, wherein:

The first high pressure gas engine comprises at least one first impeller chamber, at least one first impeller and at least one first air-jet nozzle; the impeller chamber is provided with a fumarole and an exhaust vent; the first impeller is installed inside the first impeller chamber through a first shaft; the first air-jet nozzle, jetting a high pressure gas through the fumarole into the first impeller chamber, is installed at the casing of the first impeller chamber; and the first impeller outputs primary power through the first shaft; the primary power is used for driving a power machine equipped with the wind-gas engine assembly of the present invention.

The wind resistance engine comprises at least one second impeller chamber and at least one second impeller installed inside the second impeller chamber through a second shaft; an air inlet for receiving the external wind resistance airflow and an air outlet for exhausting gas are provided at a casing of the second impeller chamber.

When the power machine equipped with the wind-gas engine assembly of the present invention is traveling at a certain speed, the external wind resistance airflow that the power machine encounters is received through the air inlet at the second impeller chamber, and the wind resistance airflow entering the second impeller chamber drives the second impeller to rotate to generate auxiliary power, which is outputted through the second shaft.

A motor vehicle comprising a body, a gear box, a drive axle and wheels is provided, which is characterized in that it further comprises a wind-gas engine assembly, which comprises at least one first high pressure gas engine and at least one wind resistance engine, wherein:

The first high pressure gas engine comprises at least one first impeller chamber, at least one first impeller and at least one first air-jet nozzle; the impeller chamber is provided with a fumarole and an exhaust vent; the first impeller is installed inside the first impeller chamber through a first shaft; the first air-jet nozzle, jetting a high pressure gas through the fumarole into the first impeller chamber, is installed at a casing of the first impeller chamber; and the first impeller outputs primary power through the first shaft.

The wind resistance engine comprises at least one second impeller chamber and at least one second impeller installed inside the second impeller chamber through a second shaft; an air inlet for receiving the external wind resistance airflow and an air outlet for exhausting gas are provided at a casing of the second impeller chamber; and a wind resistance airflow entering the second impeller chamber drives the second impeller to rotate to generate auxiliary power, which is outputted through the second shaft.

The power outputted by the first shaft and the second shaft drives the gear box via a drive mechanism, and the output of the gear box drives the drive axle, which in turn drives the wheel supporting the body.

Moreover, inside the wind resistance engine is further provided a second high pressure gas engine, which comprises at least one third impeller chamber, at least one third impeller and at least one second air-jet nozzle, wherein: the third impeller chamber and the second impeller chamber are independent of each other; the third impeller is installed inside the third impeller chamber through the second shaft extended thereinto; the second air-jet nozzle is fixed to a casing of the third impeller chamber; the second air-jet nozzle is used for jetting a high pressure gas into the third impeller chamber to drive the third impeller to rotate; and the power generated by both the second impeller and the third impeller is outputted through the second shaft.

The wind resistance engine further comprises a first one-way clutch and a power output shaft, wherein the power output of the wind resistance engine drives the power output shaft via the first one-way clutch.

The wind resistance engine further comprises a first gas supply system, a second gas supply system, a third gas supply system and a fourth gas supply system, wherein:

The first gas supply system comprises a first high pressure air tank, a first valve and a first distributor, one output of the first high pressure air tank is connected to the first distributor via the first valve, and each of multiple outputs of the first distributor is correspondingly connected via a gas pipeline to the first air-jet nozzle installed at the first impeller chamber.

The second gas supply system comprises a second valve and a second distributor, another output of the first high pressure air tank is connected to the second distributor via the second valve, each of multiple outputs of the second distributor is correspondingly connected via a gas pipeline to the second air-jet nozzle installed at the third impeller chamber.

The third gas supply system comprises a second high pressure air tank, a third valve, an intermittently bursting air-jet mechanism, a third air-jet nozzle and a fourth air-jet nozzle, the output of the second high pressure air tank is connected to the air-jet mechanism via the third valve, the power output of the wind resistance engine drives the air-jet mechanism via a second drive mechanism, the third air-jet nozzle is installed at the first impeller chamber, the fourth air-jet nozzle is installed at the third impeller chamber, and the intermittently burst high pressure gas outputted by the air-jet mechanism in multiple routes is correspondingly inputted via a gas pipeline into the third air-jet nozzle and the fourth air-jet nozzle, respectively.

The fourth gas supply system comprises a third high pressure air tank, a first pressure reducing valve and a second pressure reducing valve, and the output of the third high pressure air tank is inputted into the first high pressure air tank via the first pressure reducing valve and into the second high pressure air tank via the second pressure reducing valve, respectively.

The wind resistance engine further comprises a first high pressure gas regeneration system, a second high pressure gas regeneration system, and a third high pressure gas regeneration system, wherein:

The first high pressure gas regeneration system comprises a first air compressor and a first drive mechanism, wherein the power outputted from the gear box drives the first air compressor via the first drive mechanism, and a compressed gas generated by the first air compressor is stored in the third high pressure air tank.

The second high pressure gas regeneration system comprises symmetrically positioned left and right deceleration brakes and a high-load air compressor, wherein the deceleration brake comprises a brake disc with inner ring teeth, a transmission mechanism with outer ring teeth, a driving disc, a driven disc, a first bearing, a second bearing, a supporting base and a clutch device; the brake disc with inner ring teeth and the wheels are fixed coaxially; at a half-axle of the drive axle is installed the first bearing, to which is fixed the supporting base, to which is fixed the second bearing; the transmission mechanism is fixedly connected to the driving disc through a drive shaft supported on the second bearing; the transmission mechanism, positioned at an inner side of the second bearing such that the outer ring teeth of the transmission mechanism are engaged with the inner ring teeth of the brake disc; the driving disc positioned at an outer side of the second bearing such that the brake disc drives the transmission mechanism fixedly provided with the driving disc to rotate through the engagement when the brake disc fixed to the wheel rotates; the driven disc, fixed to one end of a shaft, moves back and forth driven by the clutch device, and drives the high-load air compressor via the other end of the shaft; and the high pressure gas generated by the high-load air compressor is inputted into the third high pressure air tank.

The third high pressure gas regeneration system comprises an electric generator, a storage battery, a motor and a third air compressor, wherein the power output of the wind resistance engine drives the electric generator via a third drive mechanism, electrical energy outputted by the electric generator is stored by the storage battery, whose output is connected to the motor, while the output of the motor drives the third air compressor, and a compressed gas generated by the third air compressor is stored in the third high pressure air tank.

Moreover, the fumarole provided at the inner side of the first impeller chamber is an air-jet slot expanding abruptly.

With the above technical solution, the present invention has the following beneficial technical effects:

1. The wind-gas engine assembly of the present invention, although simple in structure, is essentially different from a traditional engine in the following aspects: 1) the technical problems to be solved are different: the technical problem to be solved in the present invention is how to use the external wind resistance airflow as a power, while a prior art engine is powered by an internal energy source, which is mainly fuel; 2) the technology solutions are different: the air inlet provided at the wind-gas engine assembly of the present invention is always open to the outside, so as to receive the external wind resistance airflow constantly to directly drive the impeller to operate to produce the power; although the prior art engine is also provided with an opening, the opening is generally used as a fuel injection hole or a ventilation hole for providing oxygen necessary for burning; one of ordinary skill in the art would appreciate that the air inlet of the present invention for receiving the wind resistance airflow is much larger than the fuel injection hole or the ventilation hole, and the function and effect of the air inlet provided at the wind-gas engine assembly of the present invention is obviously different from that of the prior art; 3) the effects are totally different: a power machine equipped with the wind-gas engine assembly of the present invention uses the wind resistance airflow as the power; the higher the traveling speed of the power machine is, the greater the utilization of the strong wind resistance airflow is; therefore, the engine of the present invention, when employed as auxiliary power, can significantly increase the traveling speed of the power machine without remarkably increasing the amount of energy consumed when the power machine travels at a high speed; in addition, the wind-gas engine assembly of the present invention employs high pressure gas as the power, while the gas can be added simply and quickly, and the dissembly and replacement are very easy.

2. The wind-gas engine assembly of the present invention comprises a high pressure gas engine and a wind resistance engine, which are independent of each other. It is advantageous in the following aspects:

1) Based on the fact that the high pressure gas has a high flow velocity and is relatively focused while the wind resistance airflow has a low flow velocity and is relatively dispersed, the corresponding impellers can be designed pertinently to increase the energy conversion efficiency (for example, the blade of the impeller of the high pressure gas engine should be designed to be small, while the blade of the impeller of the wind resistance engine big should be designed to be large).

2) The operation state of the engine can be flexibly changed as needed to reduce unnecessary load and further save energy. For example, when the motor vehicle equipped with the wind-gas engine assembly of the present invention is in the start stage, since the traveling speed of the motor vehicle is basically zero or very low and the wind resistance is very low, the wind resistance engine substantially does not function; under this circumstance, one may only use the high pressure gas engine, and the wind resistance engine can be disengaged through the one-way clutch to make it released from the operation state and stopped rotating with the high pressure gas engine, thus reducing the load of the high pressure gas engine. When the motor vehicle is in a downhill state, since the high pressure gas engine is not needed to provide the power, the high pressure gas engine can be disengaged through the one-way clutch to make it released from the operation state and stopped rotating with the wind resistance engine, thus reducing the unnecessary energy consumption and transforming to the greatest extend the wind energy received by the wind resistance engine into the compressed gas to be stored.

3. The acceleration performance and output power of the motor vehicle can be greatly increased by further providing the second high pressure gas engine inside the wind resistance engine, and, as needed, using the first high pressure gas engine and the second high pressure gas engine at the same time, which is especially suitable for large cargo vehicles and race cars, etc.

4. The wind-gas engine assembly is provided with the first high pressure air compressor, the second high pressure air compressor, and the intermittently bursting air-jet mechanism, and can be provided with two working gases with different pressures according to different power requirements. For example, the working pressure of the second high pressure air compressor can be configured to be lower than that of the first high pressure air compressor; when a long travel is to be made for a long time at a low speed, a small amount of high pressure gas can be supplied intermittently to the high pressure gas engine through the intermittently bursting air-jet mechanism, so as to keep the power machine traveling continuously with relatively low energy consumption. On the contrary, when necessary, the working pressure of the second high pressure air compressor can be configured to be higher than that of the first high pressure air compressor, so as to provide powerful intermittent bursting performance.

5. The wind-gas engine assembly is provided with the electric generator, the storage battery and the motor in order to: 1) provide necessary electricity to be used in the vehicle (such as illumination, audio play, etc.); and 2) convert the electrical energy stored in the storage battery into high pressure gas at any time, so as to provide power for the motor vehicle for emergency uses.

6. With the third high pressure air tank and the pressure reducing valve, when the working pressures of the first high pressure air tank and the second high pressure air tank are lower than a set value, the working gas is supplied automatically via the pressure reducing valve to ensure the stable working performance of the wind-gas engine assembly.

7. With the deceleration brake, the brake energy can be recycled in time and converted into compressed gas to be stored through the high-load air compressor, which will greatly reduce the consumption of the compressed gas.

DETAILED DESCRIPTION OF THE EMBODIMENTS

The present invention will be further described below in detail with reference to drawings and embodiments.

Example 1

Figure 1:
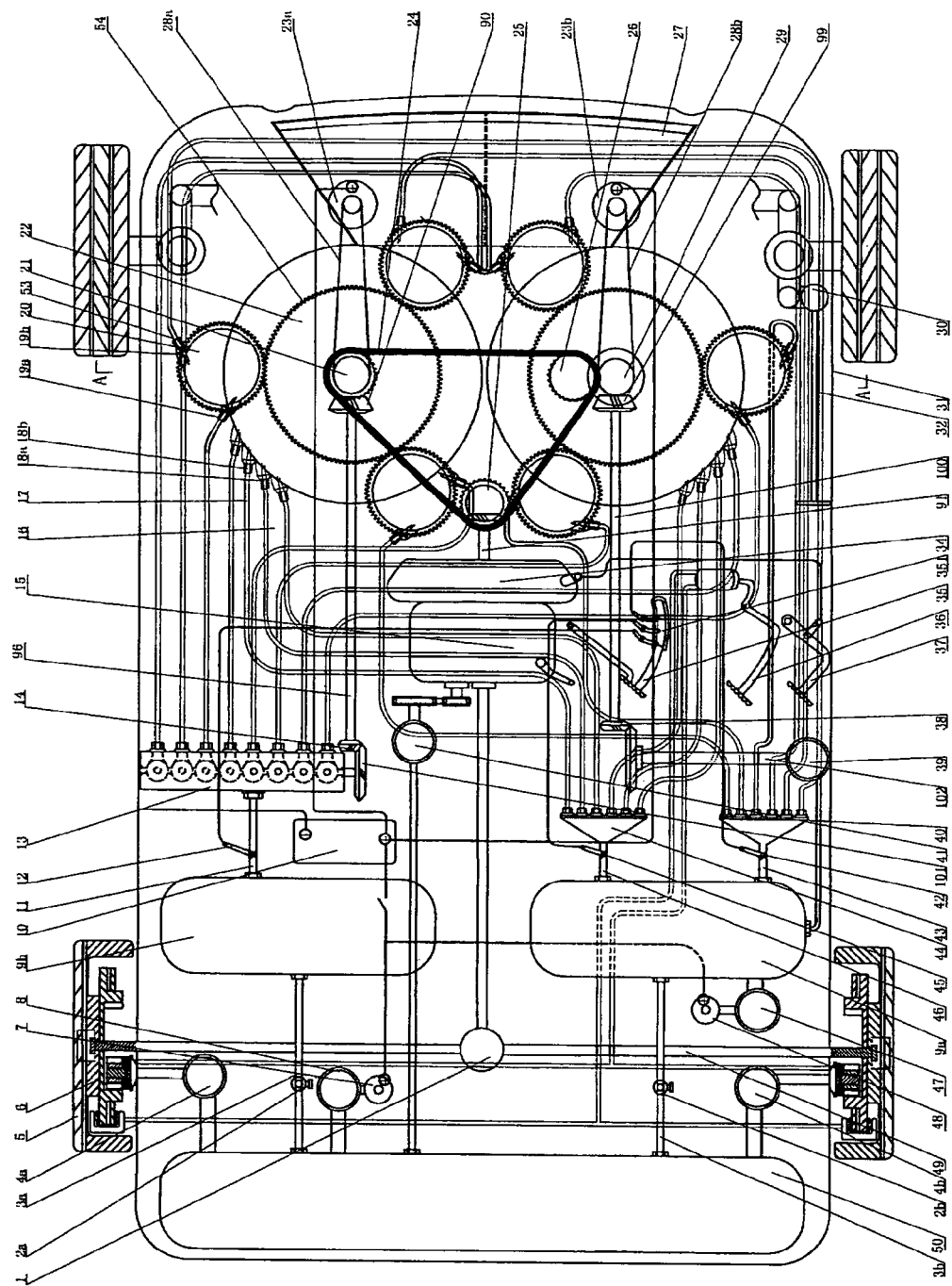
FIG. 1 is a top view of the assembly structure of the motor vehicle equipped with the wind-gas engine assembly.
Figure 2:
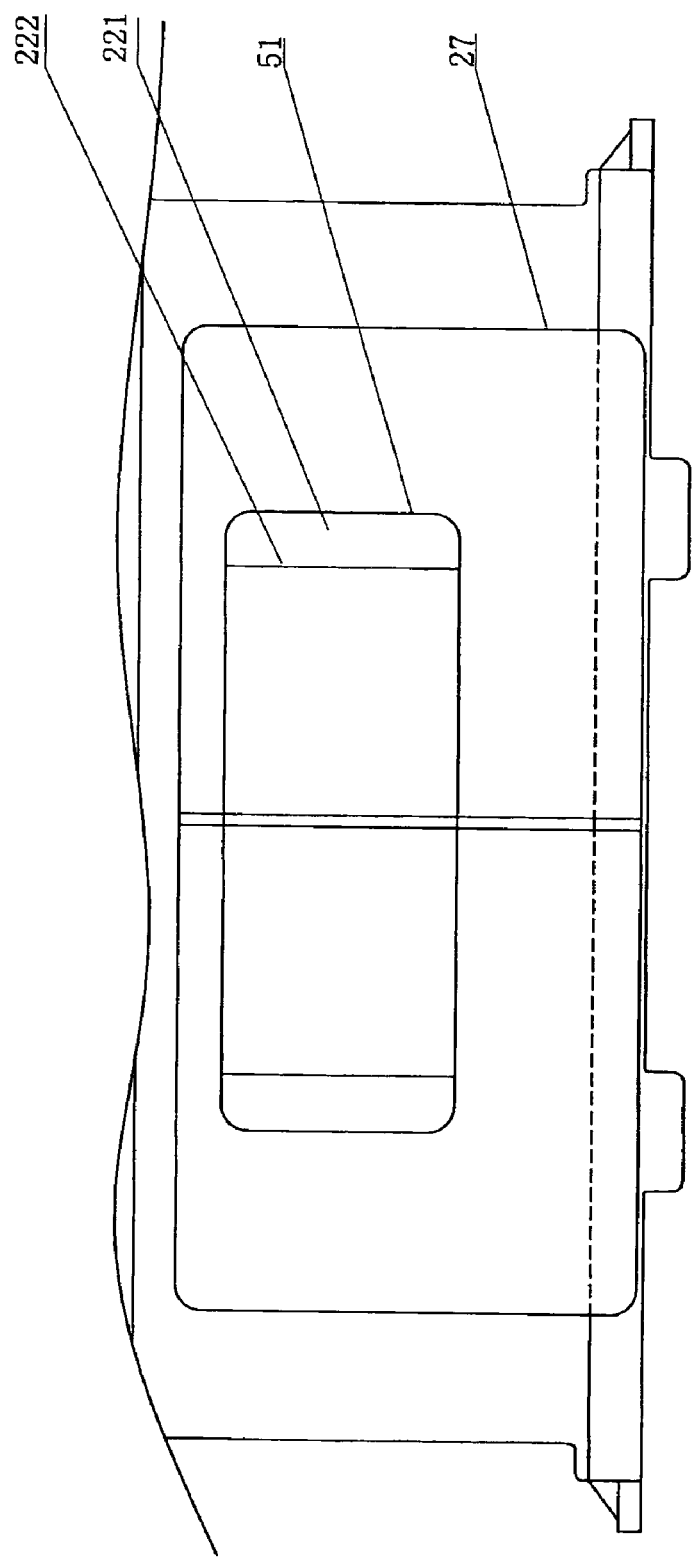
FIG. 2 is a right side view of the wind resistance engine in FIG. 1.

As shown in FIG. 1, a motor vehicle equipped with a wind-gas engine assembly comprises a body 31, a wind-gas engine assembly, a gear box 15, a drive axle 1, a half-axle 49 of the drive axle, and wheels 5.

As shown in FIGS. 1-8, the wind-gas engine assembly comprises a first high pressure gas engine 20, a wind resistance engine 22, a pinion 53, a left power output shaft 21, a right power output shaft 29, a reversing wheel 26, a primary power output shaft 91, a sprocket 24, a gas supply system, and a high pressure gas regeneration system. Two wind resistance engines 22 are positioned symmetrically left and right.

Figure 6:
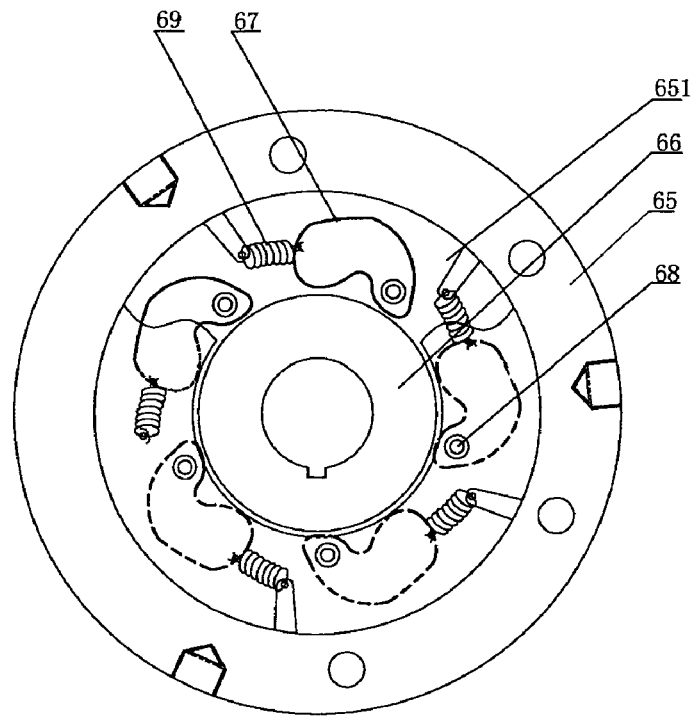
FIG. 6 is a schematic view of the structure of the one-way clutch in FIG. 3.
Figure 7:
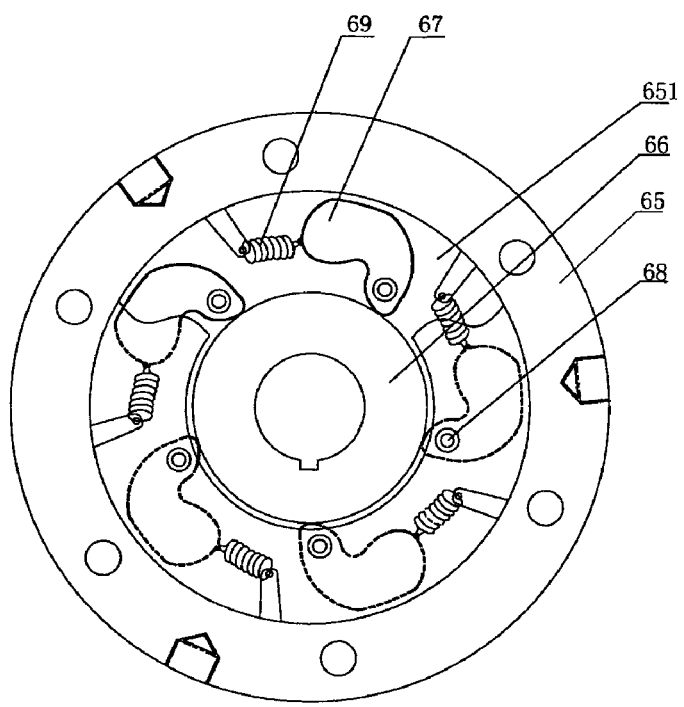
FIG. 7 is a schematic view of the structure of the one-way clutch in FIG. 6 when the inner wheel of the one-way clutch is in a locked state.

As shown in FIGS. 1, 3, 4, 6 and 7, three first high pressure gas engines 20 having the same structure are fixed symmetrically to the casing of the left and the right wind resistance engines 22, respectively. As an example, the first high pressure gas engine 20 fixed to the left wind resistance engine 22 comprises a first impeller chamber 63, a first impeller 57, a one-way clutch 55, a first air-jet nozzle 19a, and a third air-jet nozzle 19b. The structure of the one-way clutch 52, as shown in FIGS. 6 and 7, comprises an outer wheel 65, an inner wheel 66, a wedge 67, a cage 651 and a spring 69, wherein the cage 651, which is fixed to the outer wheel 65, configure the wedge 67 to be between the circular inner wheel and outer wheel 65, with the help of the spring 69 and a supporting shaft 68. When the outer wheel 65 is motionless, the inner wheel 66 may rotate freely and there is no driving relation therebetween (FIG. 6); when the outer wheel 65 rotates clockwise, the wedge 67 is locked to the inner wheel 66 (FIG. 7) under the action of the centrifugal force, rendering the inner wheel 66 rotating with the outer wheel 65. When the outer wheel 65 comes to a stop, the wedge 67 is released from the locked state with the inner wheel 66 under the action of the elastic restoring force of the spring 69. Along the casing of the first impeller chamber 63 are provided alternately fumaroles 58 and exhaust vent 61 wherein an air-jet slot 59 expanding abruptly is formed inside the fumaroles 58 and near the inner side of the first impeller chamber 63, so as to quickly increase the jetting area of the high pressure gas at the first impeller 57. The first air-jet nozzle 19a and the third air-jet nozzle 19b are correspondingly installed at the fumarole 58, and jet the high pressure gas into the first impeller chamber 63 through the respective fumarole 58, wherein the first air-jet nozzle 19a is used for jetting continuous high pressure gas into the first impeller chamber 63, and the third air-jet nozzle 19b is used for jetting intermittently burst high pressure gas into the first impeller chamber 63. The first impeller 57 in the first impeller chamber 63 is fixed to the outer wheel 65 of the one-way clutch 52. The first shaft 201 is fixedly connected to the inner wheel 66 of the one-way clutch 52. To the first shaft 201 is fixed the pinion 53, through which a first primary power generated by the rotation of the first impeller 57 is transmitted to a gear wheel 54 fixed to the left power output shaft 21.

As shown in FIGS. 1-3 and 5, the wind resistance engine 22 comprises a second impeller chamber 221, a second impeller 222 and a second high pressure gas engine 223, wherein the second high pressure gas engine 223 comprises a third impeller chamber 2231, a third impeller 2232, a second air-jet nozzle 18a and a fourth air-jet nozzle 18b. The third impeller chamber 2231 and the second impeller chamber 221 are independent of each other, and positioned in the casing of the same wind resistance engine 22. The second impeller chamber 221 is provided with an air inlet 51 for receiving the external wind resistance airflow and an air outlet 103 for exhausting gas. The third impeller chamber 2231 is provided with a fumarole and an exhaust vent similar to the fumarole 58 and the exhaust vent 61 at the first impeller chamber 63 of the first high pressure gas engine 20. The second air-jet nozzle 18a and the fourth air-jet nozzle 18b are installed at the casing of the second high pressure gas engine 223 for jetting high pressure gas into the third impeller chamber 2231 through their respective fumarole, wherein the second air-jet nozzle 18a is used for jetting the continuous high pressure gas into the third impeller chamber 2231, and the fourth air jet nozzle 18b is used for jetting the intermittently burst high pressure gas into the third impeller chamber 2231. The second impeller 222 and the third impeller 2232 are integrated, one end of which is supported on the inner wall of the second impeller chamber 221 through a shaft, and the other end of which is installed at the outer wheel 65 of the one-way clutch 55. The inner wheel 66 of is fixed to the left power output shaft 21 and the one-way clutch 55 has the same structure with the one-way clutch 52. The internal opening of a trumpet-type air duct 27, with a bigger external opening and a smaller internal opening, is fixedly connected to the air inlets 51a, 51b of the wind resistance engine 22, and the external opening of the trumpet-type air duct 27 is installed at the front end of the body 31 where the wind resistance is the greatest. The received external wind resistance airflow is guided into the second impeller chamber 221 through the trumpet-type air ducts 27a, 27b to drive the second impeller 222 to rotate to generate the auxiliary power. The auxiliary power generated by the second impeller 222 and the second primary power generated by the third impeller 2232 are outputted to the left power output shaft 21 through the one-way clutch 55. At the start stage, when the wind resistance engine 22 has no power output, although the first high pressure gas engine 20 drives the left power output shaft 21 to rotate, the wind resistance engine 22 will not rotate with the left power output shaft 21 because of the one-way driving function of the one-way clutch 55, thus reducing the starting load of the first high pressure gas engine 20.

In order to output the power via the left and the right power output shafts (21, 29) with the help of the chain 24, a reversing wheel 26 is provided beside the gear wheel 54 of the right power output shaft 29. The gear wheel 54 transmits the power output to the reversing wheel 26. A gear 25 is fixed to the primary power shaft 91 of the transmission gear box 15. The gear wheel 54, the reversing wheel 26 and the gear 25 are driven with the help of the chain 24 to transmit the power outputted from the left and the right power output shafts (21, 29) to the primary power shaft 91. The power is then transmitted to the drive axle 1 through the gear box 15. The drive axle 1 is connected to the half-axle 49 of the drive axle; and the half-axle 49 drives the wheel 5 supporting the body 31 to rotate.

Figure 3:
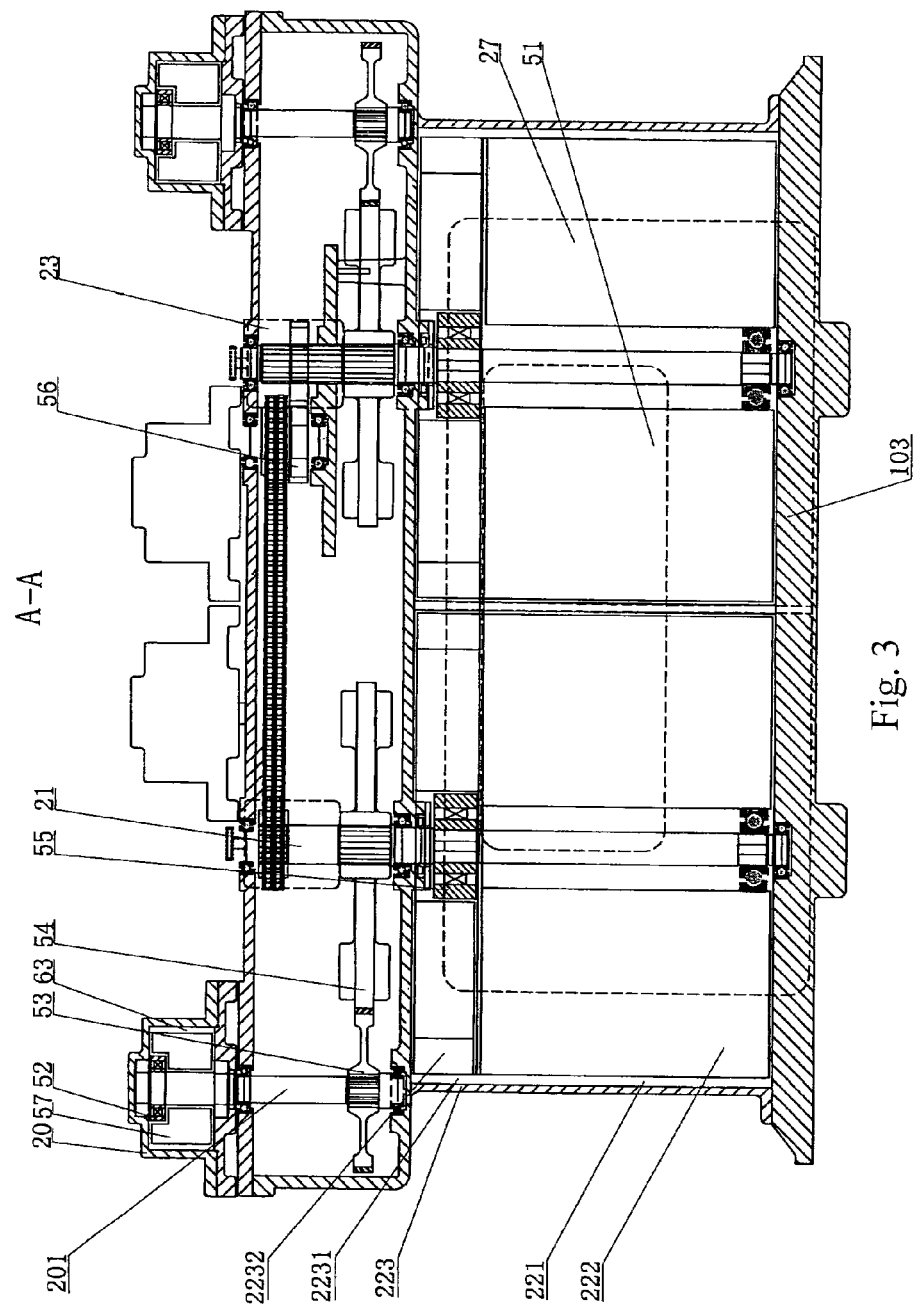
FIG. 3 is a sectional view along the line A-A in FIG. 1.
Figure 4:
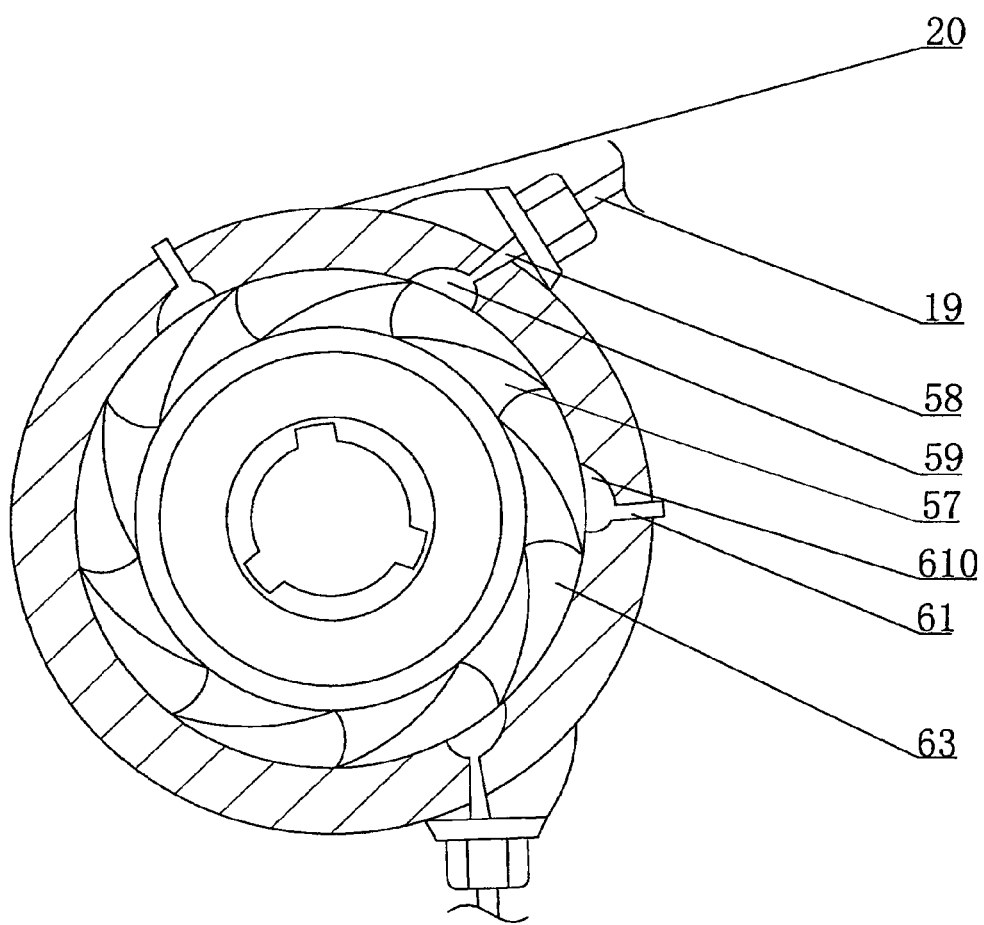
FIG. 4 is an enlarged schematic view of the structure of the first high pressure gas engine in FIG. 1.
Figure 5:
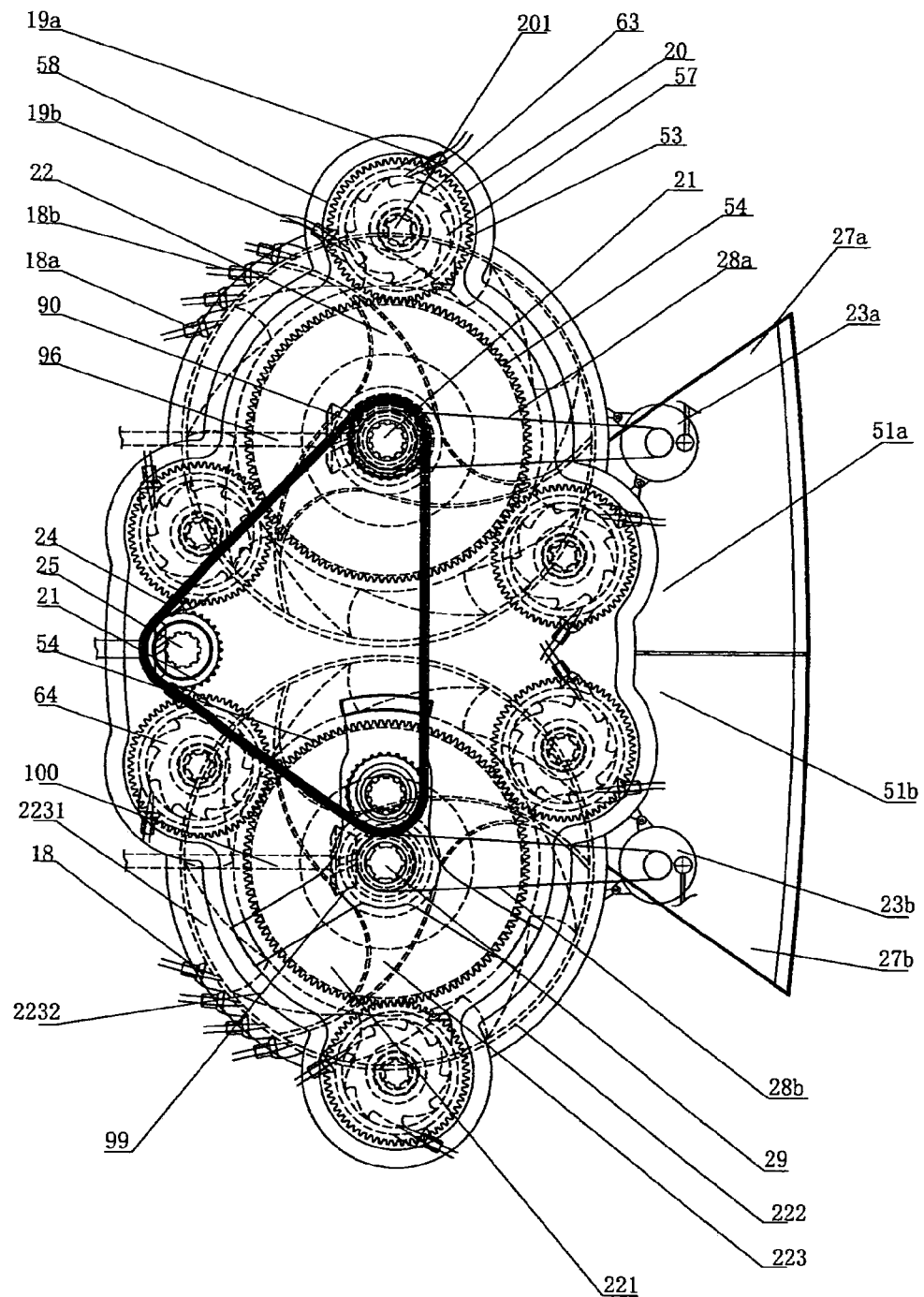
FIG. 5 is an enlarged schematic view of the structure of driving relation between the first high pressure gas engine and the wind resistance engine in FIG. 1.

As shown in FIGS. 1 and 3, the gas supply system comprises a first gas supply system, a second gas supply system, a third gas supply system and a fourth gas supply system, wherein:

the first gas supply system comprises a first high pressure air tank 9a, a first valve 42 and a first distributor 40, wherein one output of the first high pressure air tank 9a is connected to the first distributor 40 via the first valve 42, and each of the multiple outputs of the first distributor 40 is correspondingly connected to the first air-jet nozzle 19a installed at the casing of the first high pressure gas engine 20, so as to provide continuous high pressure gas for the first impeller chamber 63.

The second gas supply system comprises the first high pressure air tank 9a, a second valve 45 and a second distributor 44, wherein another output of the first high pressure air tank 9a is connected to the second distributor 44 via the second valve 45, each of the multiple outputs of the second distributor 44 is correspondingly connected to the second air-jet nozzle 18a installed at the casing of the second high pressure gas engine 223, and the second air-jet nozzle 18a provides continuous high pressure gas for the third impeller chamber 2231.

Figure 8:
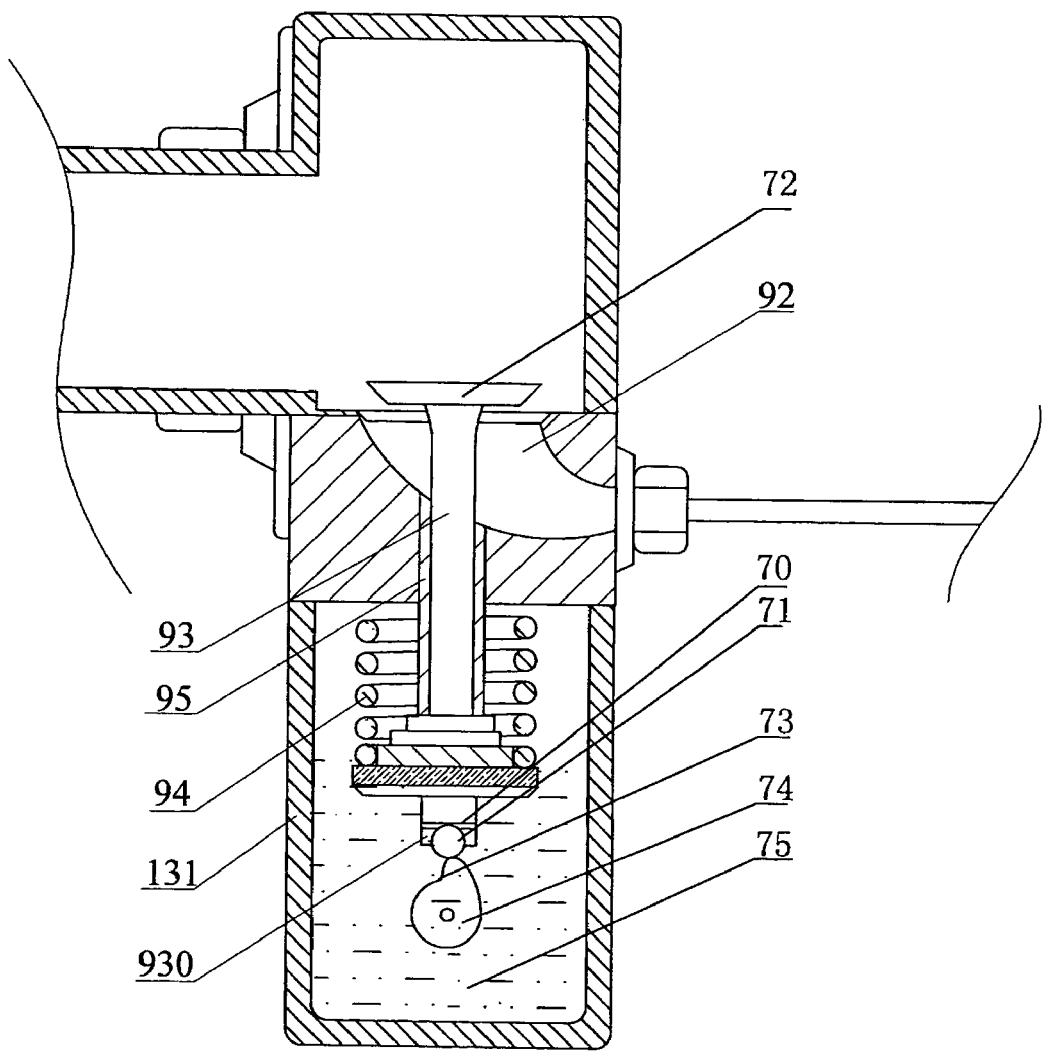
FIG. 8 is a schematic view of the internal structure of the air-jet mechanism in FIG. 1.

The third gas supply system comprises a second high pressure air tank 9b, a third valve 12, an intermittently bursting air-jet mechanism 13, a third air-jet nozzle 19b and a fourth air-jet nozzle 18b. The function of the air-jet mechanism 13 is to transform the continuously inputted gas into multiple routes of the intermittently outputted gas. The internal structure of the air-jet mechanism 13, as shown in FIG. 8, comprises multiple distribution controllers 131 and camshafts 74, wherein each of the distribution controllers 131 comprises a valve 72, a mandril 93, a valve port 92 and an elastic restoring device 94. The front end of the mandril 93 is fixed to the valve 72, and the rear part of the mandril 93 is inserted into a lubrication oil chamber 75 through a gland 95, and nested in and fixedly connected to the elastic restoring device 94. The rear end of the mandril 93 is provided with a chamber 930 and an oil passage 70. At the camshaft 74 is provided a set of cams 73 separated by a certain distance for driving each of the mandrils 93. The lubrication oil is introduced into the chamber 930 through the oil passage 70. In the chamber 930 is provided a rolling ball 71. Under the action of the lubrication oil, the frictional resistances between the rolling ball 71 and the cam 73 at the camshaft 74 as well as between the rolling ball 71 and the chamber 930 can be greatly reduced. When the rolling ball 71 at the rear end of the mandril 93 is pushed by the cam 73, the mandril 93 and the valve 72 move upwards to open the valve port 92; when the rolling ball 71 is not pushed by the cam 73, the mandril 93 and the valve 72 return to the natural state under the action of the elastic restoring force, and the valve 72 closes the valve port 92. During operation, the power outputted from the left power output shaft 21 drives the camshaft 74 to rotate via a conical gear 90, a second drive shaft 96 and a conical gear 14. Each of the cams 74 at the camshaft 73 intermittently pushes the ball 71 at the rear end of the mandril 93, so as to periodically open and close the valve port 92. When the third valve 12 is opened, the intermittently burst high pressure gas is generated through the air-jet mechanism 13. The output of the second high pressure air tank 9b is connected to the air-jet mechanism 13 via the third valve 12. The third air-jet nozzle 19b is installed at the casing of the first impeller chamber 63. The fourth air-jet nozzle 18b is installed at the casing of the third impeller chamber 2231. The intermittently burst high pressure gas outputted from the air-jet mechanism 13 in multiple routes is jetted into the first high pressure gas engine 20 via the third air-jet nozzle 19b, and into the second high pressure gas engine 223 via the fourth air-jet nozzle 18b, generating the power output. When a long travel is to be made for a long time at a low speed, it is only needed to intermittently supply a small amount of high pressure gas to the first high pressure gas engine 20 and the second high pressure gas engine 223 through the intermittently bursting air-jet mechanism 13, so as to keep the power machine traveling continuously with low energy consumption.

In order to conveniently control the three valves, a valve pedal 35 is provided, as shown in FIG. 1. The valves (42, 44 and 12) are controlled respectively by triggering a corresponding travel switch 351 through the pedal 35, so as to control the first to the third gas supply systems.

It is necessary to explain that, two different working pressures can be provided as needed by separately providing different first high pressure air tank 9a and second high pressure air tank 9b, so as to improve the start and acceleration performance of the motor vehicle. For example, the instantaneous bursting performance of the engine can be improved by increasing the working pressure of the second high pressure air tank 9b.

Considering that the first high pressure air tank 9a and the second high pressure air tank 9b may consume high pressure gas constantly in the working process, the working pressure will decline gradually, which will directly affect the working performance of the wind-gas engine assembly. Therefore, the present invention provides the fourth gas supply system, which will provide constant working pressure for the first high pressure air tank 9a and the second high pressure air tank 9b, thus ensuring the stable working performance of the wind-gas engine assembly.

The fourth gas supply system comprises a third high pressure air tank 50, a first pressure reducing valve 2b, and a second pressure reducing valve 2a. The pressure of the high pressure gas stored in the third high pressure air tank 50 is much higher than that of the working gas in the first high pressure air tank 9a and the second high pressure air tank 9b. The output of the third high pressure air tank 50 is inputted into the first high pressure air tank 9a via the first pressure reducing valve 2b, and is inputted into the second high pressure air tank 9b via the second pressure reducing valve 2a. With the third high pressure air tank 50 and the pressure reducing valves (2a, 2b), when the working pressures of the first high pressure air tank 9a and the second high pressure air tank 9b are lower than a set value, the working gas will be automatically supplemented via the pressure reducing valves (2a, 2b) to ensure the stable working performance of the wind-gas engine assembly.

As shown in FIG. 1, the high pressure gas regeneration system comprises a first high pressure gas regeneration system, a second high pressure gas regeneration system, a third high pressure gas regeneration system, and a fourth high pressure gas regeneration system.

The first high pressure gas regeneration system comprises a first air compressor 41 and a first drive mechanism 96, wherein the power outputted from the gear box 15 drives the first air compressor 41 via the first drive mechanism 96, and the compressed gas generated by the first air compressor 41 is stored in the third high pressure air tank 50.

Figure 9:
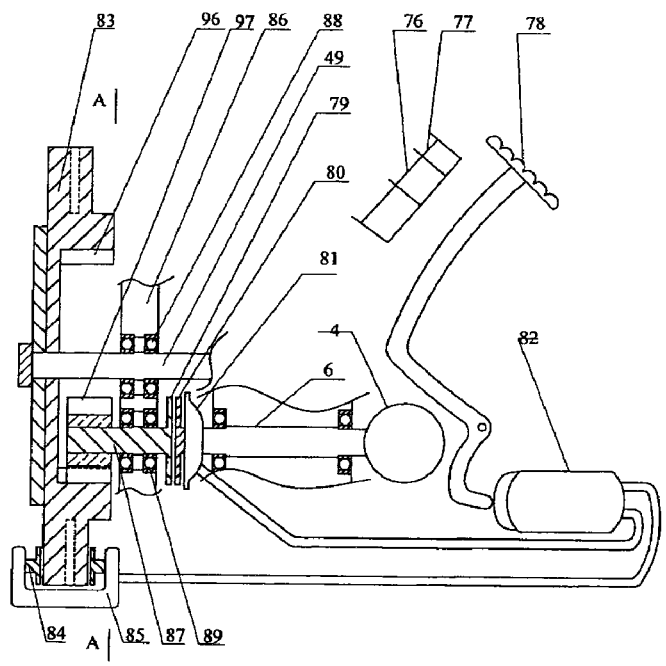
FIG. 9 is a schematic view of the structure of the deceleration brake.
Figure 10:
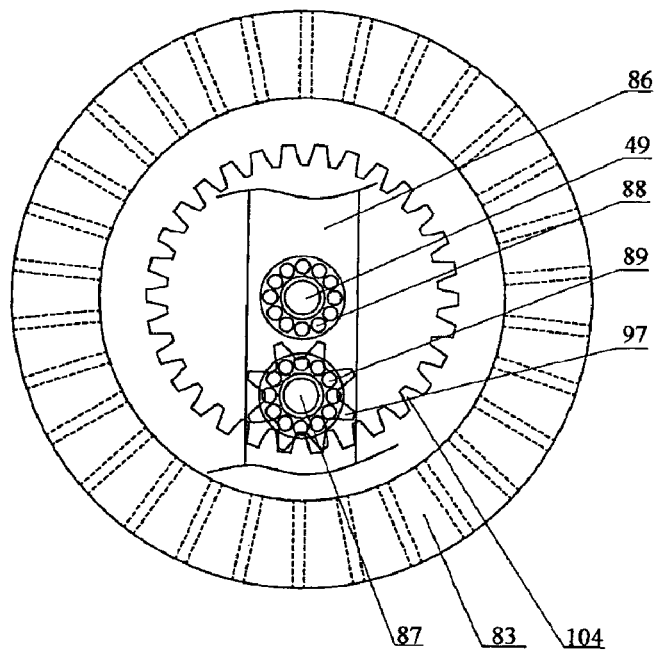
FIG. 10 is a structural schematic view of engagement between the brake disc and the transmission mechanism in FIG. 9.

As shown in FIGS. 1, 9 and 10, the second high pressure gas regeneration system comprises deceleration brakes and high-load air compressors (4a, 4b) positioned symmetrically left and right. The deceleration brakes are used for converting inertia kinetic energy of the traveling motor vehicle into rotation kinetic energy, so as to utilize rotation kinetic energy to drive the high-load air compressor to work, converting braking energy into the form of compressed gas for storing the energy. As an example, the second high pressure gas regeneration system at the left side of the wheel 5 will be described below. The deceleration brake 6 comprises a brake disc 83 fixedly provided with inner ring teeth 104, a transmission mechanism 87 with outer ring teeth 97, a driving disc 79, a driven disc 80, a first bearing 88, a second bearing 89, a supporting base 86 and a clutch device. The brake disc 83 fixedly provided with inner ring teeth 104 and the wheel 5 are fixed coaxially. The first bearing 88 is installed at the half-axle 49 of the drive axle, the supporting base 86 is fixed to the first bearing 88, and the second bearing 89 is fixed to the supporting base 86. The transmission mechanism 87 with outer ring teeth 97 is fixedly connected to the driving disc 79 through the drive shaft 79a, which is supported on the second bearing 89. The transmission mechanism 87 with outer ring teeth 97 is positioned at the inner side of the second bearing 89, and outer ring teeth 97 of the transmission mechanism 87 are engaged with the inner ring teeth 104 of the brake disc 83. The driving disc 79 is positioned at the outer side of the second bearing 89. When the brake disc 83 fixed to the wheel 5 rotates, it drives the transmission mechanism 87 to rotate through engagement, and drives the driving disc 79 and the transmission mechanism 87 to rotate coaxially. The driven disc 80 provided corresponding to the driving disc 79 is pushed to move back and forth by the clutch device. The clutch device comprises a pedal 78, a hydraulic chief-pump 82 and a hydraulic actuating pump 81. The hydraulic chief-pump 82 is controlled through the pedal 78. And the output of the hydraulic chief-pump 82 controls the hydraulic actuating pump 81, which pushes the driven disc 80 to move back and forth. The driven disc 80 is fixed to one end of a shaft 6 to drive the high-load air compressor 4a through the other end of the shaft 6. The high pressure gas generated by the high-load air compressor 4a is inputted into the third high pressure air tank 50 to be stored.

The travel of the pedal 78 is classified into a deceleration braking pressurizing travel 77 and a deceleration braking travel 76. When it is required to decelerate, the pedal 78 is stepped down to the position of deceleration braking pressurizing travel 77, and the pedal 78 drives the hydraulic chief-pump 82, which drives the hydraulic actuating pump 81, which pushes the driven disc 80 to engage with the driving disc 79. As a result, when the driving disc 79 rotates, the driven disc 80 is driven to rotate, which drives the high-load air compressor 4a to work, and thus the braking inertial energy is regenerated and converted into the high pressure gas that is supplied to the air tank 50 to be stored. When it is required to brake, the pedal 78 is stepped down to the position of deceleration braking travel 76, and the pedal 78 drives the hydraulic chief-pump 82, which acts on the hydraulic actuating pump 81 and the hydraulic actuating pump 85 simultaneously. On one hand, the deceleration braking pressurizing process continues through the second high pressure gas regeneration system; on the other hand, the brake pad 84 is pushed by the hydraulic actuating pump 85 to brake quickly at same time.

The third high pressure gas regeneration system comprises left and right electricity generators (23a, 23b), a storage battery 10, a motor 7 and a third air compressor 8. The power output of the left and the right wind resistance engines drives the electric generators (23a, 23b) via transmission belts (28a, 28b). The electrical energy outputted by the electric generators (23a, 23b) is stored by the storage battery 10, whose output is connected to the motor 7. The output of the motor 7 drives the third air compressor 8, and the compressed gas generated by the third air compressor 8 is stored in the third high pressure air tank 50.

The fourth high pressure gas regeneration system comprises a fourth air compressor 39 and a fourth drive mechanism, wherein the fourth drive mechanism comprises a conical gear 99, a drive shaft 100, a conical gear 101, and a drive shaft 101. The power output of the right power output shaft 29 drives the fourth air compressor 39 through the conical gear 99, the drive shaft 100, the conical gear 101 and the drive shaft 101, and the compressed gas generated by the fourth air compressor 39 is stored in the first high pressure air tank 9a.

It is necessary to explain that, as appreciated by one of ordinary skill in the art, the high pressure gas regenerated by any high pressure gas regeneration system can be stored in any air tank. However, it is preferred to introduce the regenerated high pressure gas into the third high pressure air tank 50 to be stored, so as to keep the working pressures of high pressure gas in the first high pressure air tank 9a and the second high pressure air tank 9b relatively constant, and not changed by the input of the regenerated high pressure gas, and to keep the working performance of the engine not affected.

In order to make the present invention better understood, the starting, traveling and braking process of the motor vehicle will be briefly described below, respectively:

In the starting stage, the valve pedal 35 is stepped down to the travel of the first valve 42 to open the first valve 42. Continuous high pressure gas is jetted into each of the first high pressure gas engines 20 through the first gas supply system. The power is provide by the first high pressure gas engine 20 to the drive axle 1 sequentially via the one-way clutch 52, the pinion 53, the gear wheel 54, the left and the right power output shafts (21, 29), the chain 24, the gear 25, the primary power shaft 91 and the gear box 15 to drive the wheels 5 to rotate via the half-axle 49 of the drive axle. During this process, the wind resistance engine 22 has no power output since the wind resistance is very low, and the wind resistance engine 22 will not rotate with the left power output shaft 21 because of the one-way driving function of the one-way clutch 55. If the power is not enough for starting, the second valve 45 can be further opened to start the second high pressure gas engine 223 in the wind resistance engine 22 through the second gas supply system. The power provided by the first high pressure gas engine 20 and the second high pressure gas engine 223 together may improve the starting performance of the motor vehicle.

When the motor vehicle travels at a certain speed, the external wind resistance airflow that the motor vehicle encounters is received through the wind resistance airflow air inlet 51 to drive the second impeller 222 to rotate, so as to generate the auxiliary power. At this time, the high pressure gas engine 20 and the wind resistance engine 22 together provide power for the motor vehicle.

When it is not necessary to provide power for the motor vehicle, for example, when the motor vehicle is going downhill or in a sliding state, the first high pressure gas regeneration system, the second high pressure gas regeneration system, and the third high pressure gas regeneration system can be started to recover the surplus wind resistance airflow in time and transform it into the regenerated high pressure gas to be inputted into the air tank to be stored for use.

When the motor vehicle is required to be decelerated and braked, the second high pressure gas regeneration system is started. The deceleration brake can convert inertia kinetic energy of the traveling motor vehicle into rotation kinetic energy, which is utilized to drive the high-load air compressors (4a, 4b) to work, thus skillfully converting the braking energy into the form of compressed gas for storing the energy. This solution can greatly reduce consumption of the compressed gas, especially when in a city where there is a traffic jam and decelerating and braking are often needed.

Example 2

Figure 11:
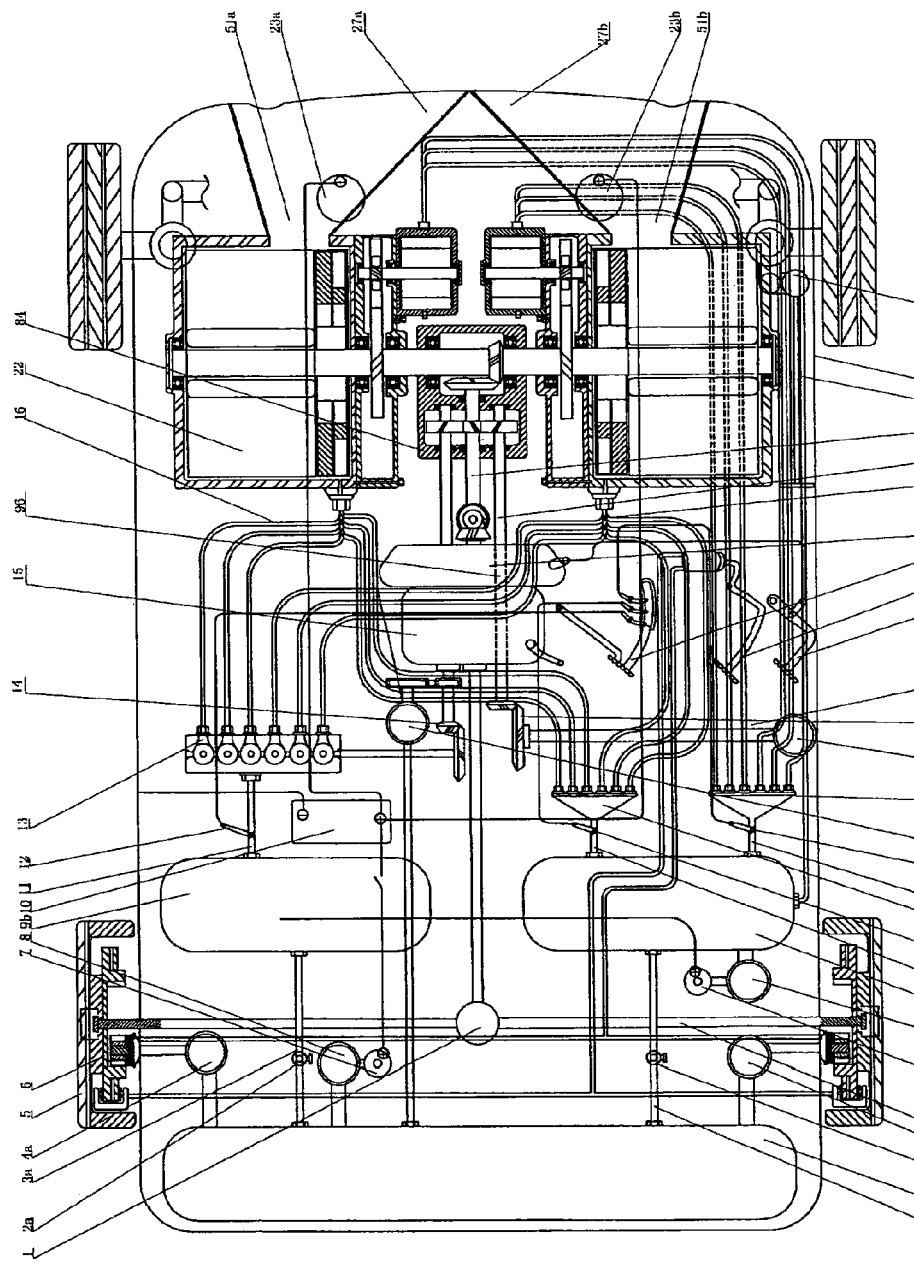
FIG. 11 is a schematic structural view of another motor vehicle equipped with the wind-gas engine assembly.

Another motor vehicle equipped with the wind-gas engine assembly is provided, as shown in FIG. 11. This example is different from Example 1 in that: the high pressure gas engine 20 and the wind resistance engine 22 in this example are installed horizontally, while the high pressure gas engine 20 and the wind resistance engine 22 in Example 1 are installed vertically; that is, the shafts of the high pressure gas engine 20 and the wind resistance engine 22 in this example are horizontal, while the shafts of the high pressure gas engine 20 and the wind resistance engine 22 in Example 1 is vertical. Therefore, in this example, the left power output shaft 21 and the right power output shaft 29 are integrated and rotate coaxially, and are not necessary to be driven by the reversing wheel or the chain. In addition, two separate trumpet-type air ducts (27a, 27b) are needed since the space between the wind resistance airflow air inlets (51a, 51b) provided at the left and the right wind resistance engines 22 is large and the trumpet-type air duct is somewhat different in shape; while in Example 1, the trumpet-type air ducts (27a, 27b) are integrated because the air inlets (51a, 51b) are close to each other. Except for those above, the structure is the same with that in Example 1.

What is claimed is:

1. A wind-gas engine assembly, comprising:
   at least one first high pressure gas engine; and
   at least one wind resistance engine,
   wherein the first high pressure gas engine comprises at least one first impeller chamber, at least one first impeller and at least one first air-jet nozzle; the impeller chamber is provided with a fumarole and an exhaust vent; the first impeller is installed inside the first impeller chamber through a first shaft; the first air-jet nozzle, jetting a high pressure gas through the fumarole into the first impeller chamber, is installed at the casing of the first impeller chamber; and the first impeller outputs primary power through the first shaft,
   wherein the wind resistance engine comprises at least one second impeller chamber and at least one second impeller installed inside the second impeller chamber through a second shaft; an air inlet for receiving external wind resistance airflow and an air outlet for exhausting gas are provided at a casing of the second impeller chamber; and a wind resistance airflow entering the second impeller chamber drives the second impeller to rotate to generate auxiliary power which is outputted through the second shaft.

2. The wind-gas engine assembly according to claim 1, wherein inside the wind resistance engine is further provided a second high pressure gas engine, which comprises:
   at least one third impeller chamber,
   at least one third impeller, and
   at least one second air-jet nozzle,
   wherein the third impeller chamber and the second impeller chamber are independent of each other; the third impeller is installed inside the third impeller chamber through the second shaft extended thereinto; the second air-jet nozzle is fixed to a casing of the third impeller chamber; the second air-jet nozzle is used for jetting a high pressure gas into the third impeller chamber to drive the third impeller to rotate; and power generated by both the second impeller and the third impeller is outputted through the second shaft.

3. The wind-gas engine assembly according to claim 2, comprising a first one-way clutch and a power output shaft, wherein the power output of the wind resistance engine drives the power output shaft via the first one-way clutch, such that the impeller of the wind resistance engine will not rotate with the power output shaft when the wind resistance engine has no power output.

4. The wind-gas engine assembly according to claim 3, comprising a second one-way clutch, wherein the power output of the first high pressure gas engine drives the second one-way clutch, and the output of the second one-way clutch drives the power output shaft via a driving mechanism, such that the impeller of the first high pressure gas engine will not rotate with the power output shaft when the first high pressure gas engine has no power output.

5. The wind-gas engine assembly according to claim 1, further comprising a first gas supply system which comprises a first high pressure air tank, a first valve and a first distributor, wherein the output of the first high pressure air tank is connected to the first distributor via the first valve, and each of multiple outputs of the first distributor is correspondingly connected via a gas pipeline to the first air-jet nozzle installed at the first impeller chamber.

6. The wind-gas engine assembly according to claim 5, comprising a fourth gas supply system which comprises a third high pressure air tank and a first pressure reducing valve, and the output of the third high pressure air tank being inputted into the first high pressure air tank via the first pressure reducing valve.

7. The wind-gas engine assembly according to claim 6, comprising a first high pressure gas regeneration system which comprises a first air compressor and a first drive mechanism, the power output of the wind resistance engine driving the first air compressor via the first drive mechanism, and a compressed gas generated by the first air compressor being stored in the third high pressure air tank.

8. The wind-gas engine assembly according to claim 1, wherein the fumarole provided at an inner side of the first impeller chamber is an air-jet slot expanding abruptly.

9. The wind-gas engine assembly according to claim 2, comprising a first gas supply system and a second gas supply system, wherein the first gas supply system comprises a first high pressure air tank, a first valve and a first distributor, and one output of the first high pressure air tank is connected to the first distributor via the first valve, and each of multiple outputs of the first distributor is correspondingly connected via a gas pipeline to the first air jet nozzle installed at the first impeller chamber; the second gas supply system comprises a second valve and a second distributor; another output of the first high pressure air tank is connected to the second distributor via the second valve; and each of multiple outputs of the second distributor is correspondingly connected via a gas pipeline to the second air-jet nozzle installed at the third impeller chamber.

10. The wind-gas engine assembly according to claim 8, comprising a third gas supply system which comprises a second high pressure air tank, a third valve, an intermittently bursting air-jet mechanism, a third air-jet nozzle and a fourth air-jet nozzle, wherein the output of the second high pressure air tank is connected to the air jet mechanism via the third valve; the power output of the wind resistance engine drives the air-jet mechanism via a second drive mechanism; the third air-jet nozzle is installed at the casing of the first impeller chamber; the fourth air-jet nozzle is installed at the casing of the third impeller chamber; and the intermittently burst high pressure gas outputted by the air-jet mechanism in multiple routes is correspondingly inputted via a gas pipeline into the third air-jet nozzle and the fourth air-jet nozzle, respectively.

11. The wind-gas engine assembly according to claim 9, comprising a fourth gas supply system which comprises a third high pressure air tank, a first pressure reducing valve and a second pressure reducing valve, and the output of the third high pressure air tank being inputted into the first high pressure air tank via the first pressure reducing valve and into the second high pressure air tank via the second pressure reducing valve, respectively.

12. The wind-gas engine assembly according to claim 10, comprising a first high pressure gas regeneration system which comprises a first air compressor and a first drive mechanism, the power output of the wind resistance engine driving the first air compressor via the first drive mechanism, and a compressed gas generated by the first air compressor being stored in the third high pressure air tank.

13. The wind-gas engine assembly according to claim 10, comprising a third high pressure gas regeneration system which comprises an electric generator, a storage battery, a motor and a third air compressor, wherein the power output of the wind resistance engine drives the electric generator via a third drive mechanism, electrical energy outputted by the electric generator is stored in the storage battery, whose output is connected to the motor, and the output of the motor drives the third air compressor, and a compressed gas generated by the third air compressor is stored in the third high pressure air tank.

14. A motor vehicle, comprising a body, a gear box, a drive axle and wheels, wherein the motor vehicle further comprises a wind-gas engine assembly comprising:
at least one first high pressure gas engine; and
at least one wind resistance engine,
wherein the first high pressure gas engine comprises at least one first impeller chamber, at least one first impeller and at least one first air-jet nozzle; the impeller chamber is provided with a fumarole and an exhaust vent; the first impeller is installed inside the first impeller chamber through a first shaft; the first air-jet nozzle, jetting a high pressure gas through the fumarole into the first impeller chamber, is installed at a casing of the first impeller chamber; and the first impeller outputs primary power through the first shaft,
wherein the wind resistance engine comprises at least one second impeller chamber and at least one second impeller installed inside the second impeller chamber through a second shaft; an air inlet for receiving external wind resistance airflow and an air outlet for exhausting gas are provided at a casing of the second impeller chamber; and a wind resistance airflow entering the second impeller chamber drives the second impeller to rotate to generate auxiliary power which is output through the second shaft,
wherein power outputted by the first shaft and the second shaft drives the gear box via a drive mechanism, and the output of the gear box drives the drive axle, which drives the wheels supporting the body.

15. The motor vehicle according to claim 14, wherein inside the wind resistance engine is further provided a second high pressure gas engine, which comprises:
at least one third impeller chamber,
at least one third impeller, and
at least one second air-jet nozzle,
wherein the third impeller chamber and the second impeller chamber are independent of each other; the third impeller is installed inside the third impeller chamber through the second shaft extended thereinto; the second air-jet nozzle is fixed to a casing of the third impeller chamber; the second air-jet nozzle is used for jetting a high pressure gas into the third impeller chamber to drive the third impeller to rotate; and power generated by both the second impeller and the third impeller is outputted through the second shaft.

16. The motor vehicle according to claim 15, comprising a first one-way clutch and a power output shaft, wherein the power output of the wind resistance engine drives the power output shaft via the first one-way clutch.

17. The motor vehicle according to claim 14, further comprising a first gas supply system which comprises a first high pressure air tank, a first valve and a first distributor, wherein the output of the first high pressure air tank is connected to the first distributor via the first valve, and each of multiple outputs of the first distributor is correspondingly connected via a gas pipeline to the first air-jet nozzle installed at the first impeller chamber.

18. The motor vehicle according to claim 17, comprising a fourth gas supply system which comprises a third high pressure air tank and a first pressure reducing valve, and the output of the third high pressure air tank being inputted into the first high pressure air tank via the first pressure reducing valve.

19. The motor vehicle according to claim 18, comprising a first high pressure gas regeneration system which comprises a first air compressor and a first drive mechanism, the power outputted from the gear box driving the first air compressor via the first drive mechanism, and a compressed gas generated by the first air compressor being stored in the third high pressure air tank.

20. The motor vehicle according to claim 18, comprising a second high pressure gas regeneration system which comprises symmetrically positioned left and right deceleration brakes and a high-load air compressor, wherein the deceleration brake comprises a brake disc with inner ring teeth, a transmission mechanism with outer ring teeth, a driving disc, a driven disc, a first bearing, a second bearing, a supporting base and a clutch device; the brake disc with inner ring teeth and the wheels are fixed coaxially; at a half-axle of the drive axle is installed the first bearing, to which is fixed the supporting base, to which is fixed the second bearing; the transmission mechanism is fixedly connected to the driving disc through a drive shaft supported on the second bearing; the transmission mechanism, positioned at an inner side of the second bearing such that the outer ring teeth of the transmission mechanism are engaged with the inner ring teeth of the brake disc; the driving disc positioned at an outer side of the second bearing such that the brake disc drives the transmission mechanism fixedly provided with the driving disc to rotate through the engagement when the brake disc fixed to the wheel rotates; the driven disc, fixed to one end of a shaft, moves back and forth driven by the clutch device, and drives the high-load air compressor via the other end of the shaft; and the high pressure gas generated by the high-load air compressor is inputted into the third high pressure air tank.

21. The motor vehicle according to claim 15, comprising a first gas supply system, a second gas supply system and a third gas supply system, wherein the first gas supply system comprises a first high pressure air tank, a first valve and a first distributor, one output of the first high pressure air tank is connected to the first distributor via the first valve, and each of multiple outputs of the first distributor is correspondingly connected via a gas pipeline to the first air-jet nozzle installed at the first impeller chamber; the second gas supply system comprises a second valve and a second distributor, another output of the first high pressure air tank is connected to the second distributor via the second valve, each of multiple outputs of the second distributor is correspondingly connected via a gas pipeline to the second air-jet nozzle installed at the third impeller chamber; and the third gas supply system comprises a second high pressure air tank, a third valve, an intermittently bursting air-jet mechanism, a third air-jet nozzle and a fourth air-jet nozzle, the output of the second high pressure air tank is connected to the air-jet mechanism via the third valve, the power output of the wind resistance engine drives the air-jet mechanism via a second drive mechanism, the third air-jet nozzle is installed at the first impeller chamber, the fourth air-jet nozzle is installed at the third impeller chamber, and the intermittently burst high pressure gas outputted by the air-jet mechanism in multiple routes is correspondingly inputted via a gas pipeline into the third air-jet nozzle and the fourth air-jet nozzle, respectively.

22. The motor vehicle according to claim 21, comprising a fourth gas supply system which comprises a third high pressure air tank, a first pressure reducing valve and a second pressure reducing valve; the output of the third high pressure air tank being inputted into the first high pressure air tank via the first pressure reducing valve and into the second high pressure air tank via the second pressure reducing valve, respectively.

23. The motor vehicle according to claim 22, comprising a first high pressure gas regeneration system which comprises a first air compressor and a first drive mechanism, the power outputted from the gear box driving the first air compressor via the first drive mechanism, and a compressed gas generated by the first air compressor being stored in the third high pressure air tank.

24. The motor vehicle according to claim 22, comprising a second high pressure gas regeneration system which comprises symmetrically positioned left and right deceleration brakes and a high-load air compressor, wherein the deceleration brake comprises a brake disc with inner ring teeth, a transmission mechanism with outer ring teeth, a driving disc, a driven disc, a first bearing, a second bearing, a supporting base and a clutch device; the brake disc with inner ring teeth and the wheels are fixed coaxially; at a half-axle of the drive axle is installed the first bearing, to which is fixed the supporting base, to which is fixed the second bearing; the transmission mechanism is fixedly connected to the driving disc through a drive shaft supported on the second bearing; the transmission mechanism, positioned at an inner side of the second bearing such that the outer ring teeth of the transmission mechanism are engaged with the inner ring teeth of the brake disc; the driving disc positioned at an outer side of the second bearing such that the brake disc drives the transmission mechanism fixedly provided with the driving disc to rotate through the engagement when the brake disc fixed to the wheel rotates; the driven disc, fixed to one end of a shaft, moves back and forth driven by the clutch device, and drives the high-load air compressor via the other end of the shaft; and the high pressure gas generated by the high-load air compressor is inputted into the third high pressure air tank.

25. The motor vehicle according to claim 23, comprising a third high pressure gas regeneration system which comprises an electric generator, a storage battery, a motor and a third air compressor, wherein the power output of the wind resistance engine drives the electric generator via a third drive mechanism, electrical energy outputted by the electric generator is stored in the storage battery, whose output is connected to the motor, and the output of the motor drives the third air compressor, and a compressed gas generated by the third air compressor is stored in the third high pressure air tank.

26. The wind-gas engine assembly according to claim 14, wherein the fumarole provided at an inner side of the first impeller chamber is an air-jet slot expanding abruptly.

27. The wind-gas engine assembly according to claim 14, further comprising a trumpet-type air duct with a bigger external opening and a smaller internal opening, wherein the internal opening of the trumpet-type air duct is fixedly connected to an air inlet of the wind resistance engine, a wind resistance airflow received externally is guided into the second impeller chamber through the trumpet-type air duct, there are two wind resistance engines positioned symmetrically left and right; and to a casing of each of the wind resistance engines is fixed at least one of the first high pressure gas engines.

* * * * *